L. O. VAN NOSTRAND.
DIRIGIBLE HEADLIGHT.
APPLICATION FILED JULY 5, 1917.
1,250,727.
Patented Dec. 18, 1917.
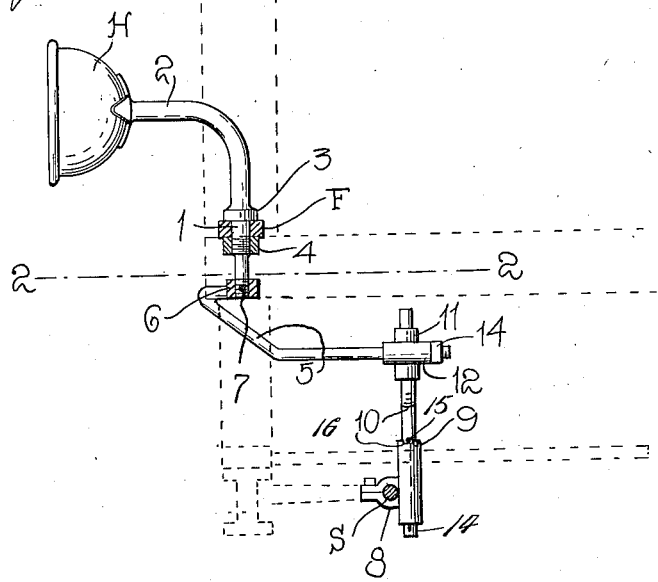
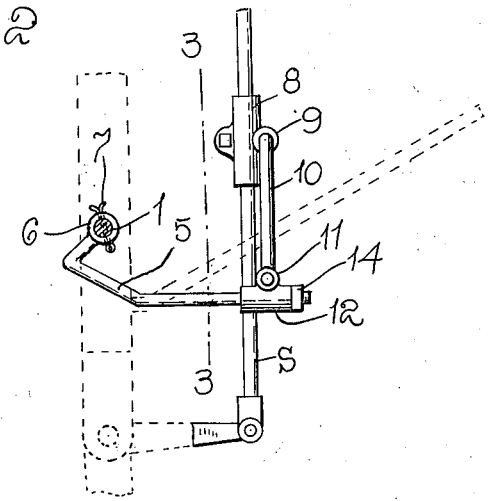
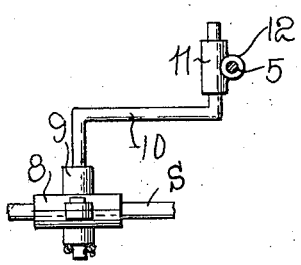
Inventor
L. O. Van Nostrand
By Watson E. Coleman
Attorney

UNITED STATES PATENT OFFICE.

LUTHER O. VAN NOSTRAND, OF PRATT, KANSAS.

DIRIGIBLE HEADLIGHT.

1,250,727.  Specification of Letters Patent.  Patented Dec. 18, 1917.

Application filed July 5, 1917. Serial No. 178,737.

*To all whom it may concern:*

Be it known that I, LUTHER O. VAN NOSTRAND, a citizen of the United States, residing at Pratt, in the county of Pratt and State of Kansas, have invented certain new and useful Improvements in Dirigible Headlights, of which the following is a specification, reference being had to the accompanying drawings.

This invention relates to certain improvements in dirigible headlights and it is an object of the invention to provide a device of this general character having novel and improved means whereby a headlight will be caused to turn in the same general direction as the turn of the vehicle to which it may be applied so that requisite illumination of the roadway in advance of the vehicle may be obtained.

The invention consists in the details of construction and in the combination and arrangement of the several parts of my improved dirigible headlight wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings, wherein Figure 1 is a view partly in elevation and partly in section illustrating a dirigible headlight constructed in accordance with an embodiment of my invention, the adjacent portion of an automobile structure being indicated by dotted lines;

Fig. 2 is a sectional view taken substantially on the line 2—2 of Fig. 1 with portions of the automobile structure in dotted lines; and Fig. 3 is a sectional view taken substantially on the line 3—3 of Fig. 2.

While I herein describe and illustrate but a single headlight it is to be understood that in practice a headlight may be positioned on each side of the body.

As herein disclosed F denotes the frame of an automobile structure and through which is loosely disposed for rotary movement at one side of the radiator a vertically directed stem 1 having its upper end portion forwardly directed as indicated at 2. Operatively engaged with the outer end of the portion 2 is a headlight of any ordinary or preferred type. The stem 1 is provided with the annular flange or stop 3 adapted to rest upon the upper face of the frame F, and operatively engaged with the stem 1 and arranged for contact with the under surface of the frame F is the removable stop or nut 4. By this arrangement the stem 1 is effectively maintained in applied position but is capable of free rotation.

5 denotes an elongated angular bar having one end portion provided with a perforate head 6 in threaded engagement with the lower end portion of the stem 1 and held against axial rotation through the medium of the cotter pin 7 or the like directed through the head 6 and the portion of the stem 1 within said head as is believed to be clearly illustrated in Figs. 1 and 2 of the drawings.

S denotes a steering rod adapted to co-act in a conventional manner with the front wheels of an automobile or other vehicle and clamped to said rod S is a sleeve 8 provided at its inner side with a vertically disposed tubular sleeve 9 open at both ends and in which is slidably engaged a free end portion of the angular rod 10. The rod 10 has its intermediate portion offset with its terminals positioned in substantially parallel planes and the opposite end portion of the rod 10 is loosely directed through a vertically disposed sleeve 11 carried by and at right angles to a second sleeve 12 through which the inner or free end portion of the rod 5 is loosely directed. Threaded upon the free end portion of the rod 5 is a stop or nut 14 which co-acts with the inner end of the sleeve 12 to prevent separation between the rod 5 and the sleeve 12 under normal conditions.

The rod 10 is maintained against longitudinal movement independently of the sleeve 9 by the pins 14 and 15 carried by the rod 10. The pin 14 underlies the sleeve 9 while the pin 15 is seated within the elongated notch or recess 16 formed in the upper edge of the sleeve 9. The notch or recess 16 co-acts with the pin 15 to limit the rotary movement of the rod 10 and which movement should not be in excess of a one-quarter turn.

As illustrated in the accompanying drawings the headlight H is in normal or straight ahead position but upon endwise movement being imparted to the steering rod S the arm 5 will be swung in the same general direction as the direction of movement of the rod S so that the headlight H will be caused to turn in the same general direction in which the vehicle turns.

From the foregoing description, it is thought to be obvious that a dirigible headlight constructed in accordance with my invention is particularly well adapted for use by reason of the convenience and facility with which it may be assembled and operated and it will also be obvious that my invention is susceptible of some change and modification without materially departing from the appearance and spirit thereof and for this reason I do not wish to be understood as limiting myself to the precise arrangement and formation of the several parts herein shown in carrying out my invention in practice except as hereinafter claimed.

Claims:

1. In combination with the frame and steering rod of a vehicle, an upstanding rod rotatably supported by the frame, an illuminating member carried by the upper portion of the rod, an arm secured to the rod, a vertically disposed sleeve secured to the steering rod, an upstanding rod loosely directed through the sleeve, means carried by the upstanding rod and co-acting with the opposite end portions of the vertically disposed sleeve for holding the upstanding rod substantially against longitudinal movement independently of the sleeve, a second sleeve loosely mounted on the inner end portion of the arm, and a vertically disposed sleeve carried by the second named sleeve and through which the upper end portion of the rod is loosely directed.

2. In combination with the frame and steering rod of a vehicle, an upstanding rod rotatably supported by the frame, an illuminating member carried by the upper portion of the rod, an arm secured to the rod, a vertically disposed sleeve secured to the steering rod, an upstanding rod loosely directed through the sleeve, means carried by the upstanding rod and co-acting with the opposite end portions of the vertically disposed sleeve for holding the upstanding rod substantially against longtudinal movement independently of the sleeve, a second sleeve loosely mounted on the inner end portion of the arm, a vertically disposed sleeve carried by the second named sleeve and through which the upper end portion of the rod is loosely directed, and a stop member engaged with the upper end portion of the arm for contact with the inner end portion of the second sleeve.

3. In combination with a frame and steering rod of a vehicle, an upstanding rod rotatably supported by the frame, an illuminating member carried by the rod, an arm secured to the rod and intersecting the vertical plane occupied by the steering rod, a vertically disposed sleeve secured to the steering rod, an upstanding rod loosely directed through the sleeve, the upper edge of said sleeve being provided with an elongated recess, a pin carried by the rod and seated in said recess, whereby downward movement of the rod is limited and whereby the extent of rotation of the rod is limited, a second sleeve loosely mounted on the inner end portion of the arm, and a vertically disposed sleeve carried by the second named sleeve and through which the upper end portion of the rod is loosely directed.

In testimony whereof I hereunto affix my signature in the presence of two witnesses.

LUTHER O. VAN NOSTRAND.

Witnesses:
CHARLEY S. McGINNESS,
GEO. H. RICKER.